United States Patent
Kohlhauser et al.

(10) Patent No.: US 8,371,588 B2
(45) Date of Patent: Feb. 12, 2013

(54) LINEAR ACTUATOR

(75) Inventors: Matthias Kohlhauser, Graz (AT); Hansjoerg Poehler, Grambach (AT)

(73) Assignee: Magna Steyr Fahrzeugtechnik AG & Co. KG, Graz (AT)

( * ) Notice: Subject to any disclaimer, the term of this patent is extended or adjusted under 35 U.S.C. 154(b) by 323 days.

(21) Appl. No.: 12/791,197

(22) Filed: Jun. 1, 2010

(65) Prior Publication Data
US 2010/0308554 A1 Dec. 9, 2010

(30) Foreign Application Priority Data
Jun. 4, 2009 (DE) .................. 10 2009 023 759
Jul. 13, 2009 (DE) .................. 10 2009 032 818

(51) Int. Cl.
*B60G 15/00* (2006.01)

(52) U.S. Cl. ............ 280/5.514; 280/5.515; 280/124.147

(58) Field of Classification Search .......... 248/560, 248/638; 267/216, 218, 175, 221, 177; 280/79, 280/5.514, 5.515, 6.157, 43.17–43.18, 43.23
See application file for complete search history.

(56) References Cited

U.S. PATENT DOCUMENTS

| | | | |
|---|---|---|---|
| 6,416,061 B1 * | 7/2002 | French et al. ............ 280/5.514 |
| 6,676,119 B2 * | 1/2004 | Becker et al. ............ 267/218 |
| 6,857,625 B2 * | 2/2005 | Loser et al. ............ 267/175 |
| 7,135,794 B2 * | 11/2006 | Kuhnel ............ 310/80 |
| 7,644,935 B2 * | 1/2010 | Munster et al. ............ 280/5.514 |
| 2009/0072460 A1 * | 3/2009 | Michel ............ 267/225 |
| 2010/0032916 A1 * | 2/2010 | Maurer et al. ............ 280/5.514 |

FOREIGN PATENT DOCUMENTS

| | | |
|---|---|---|
| DE | 102008005294 | 6/2009 |
| EP | 1681190 | 7/2006 |

* cited by examiner

*Primary Examiner* — J. Allen Shriver, II
*Assistant Examiner* — James Triggs
(74) *Attorney, Agent, or Firm* — Bachman & LaPointe, P.C.

(57) ABSTRACT

An actuator, which can be actuated along a longitudinal axis, in particular for a spring carrier, includes a stationary part, a first rotor, which can be driven so as to perform a rotary motion, a rotatable second rotor, which is supported against the stationary part in the axial direction in an axial rest position, a coupling device, by which the second rotor is coupled to the first rotor, and an output element, which is connected to the second rotor and can be moved axially by means of a rotary motion of the second rotor. The coupling device interacts with the first rotor and the second rotor in such a way that, starting from the rest position, an axial movement of the second rotor can be produced by means of a first rotary motion of the first rotor in order to release the second rotor from the stationary part and thereby bring it into a working position.

33 Claims, 13 Drawing Sheets

LINEAR ACTUATOR

BACKGROUND OF THE INVENTION

The present invention relates to an actuator which can be actuated along a longitudinal axis, in particular for a spring carrier.

Linear actuators are employed in a large number of appliances. Often there is the problem that a component which is to be driven by the actuator is subjected to a load acting parallel to the direction of actuation. As a result, the components of the actuator are subjected to severe loading, even when the actuator is not being operated. In many cases, these actuators must even actively apply a continuous holding force in order to counteract the load and prevent unwanted adjustment.

The problems can be illustrated clearly using a spring carrier in a wheel suspension system of a vehicle. Spring carriers of this kind often have a coil spring which is arranged between two spring plates and the preload of which can be set by axial movement of one of the spring plates. In this way, the spring force is influenced by a displacement of the spring characteristic in order then to be able to regulate the level of the vehicle. In order to move the spring plate, the usual practice is to use an actuator comprising an electric motor and a threaded spindle which interacts with a threaded nut connected to the spring plate.

The wheel loads of the vehicle act in the longitudinal direction of the spring carrier. These loads are transmitted at least partially via the threaded nut and the threaded spindle and hence via the actuator. Because they are subjected continuously to static and dynamic loads, the components of the actuator must be of correspondingly robust dimensions. Moreover, there is a need for the presence of devices which prevent unwanted movement of the spring plate by the wheel loads. In individual cases, additional brakes or switchable double overrunning clutches are provided for this purpose. Moreover, there is a need for a "fail-safe" configuration of such devices, for safety reasons among others. They must be controlled separately and may require their own energy supply. A holding force counteracting the unwanted displacement can also be provided by the electric motor itself but this results in high energy consumption.

It is an object of the invention to provide an actuator of the type stated at the outset which reliably permits axial movement and at the same time provides a supporting or locking function which at least partially relieves the actuator of loads when it is not being operated. The intention is that the actuator should be compact and inexpensive and provide the above-mentioned functions without additional energy supply systems.

SUMMARY OF THE INVENTION

The actuator according to the invention comprises a stationary part and a first rotor, which can be driven so as to perform a rotary motion. When used for a spring carrier of a motor vehicle, the stationary part can be a part fixed to the vehicle, for example. The first rotor can be part of an electric motor, for example. A rotatable second rotor (e.g. threaded spindle), which is supported against the stationary part in the axial direction in an axial rest position, is furthermore provided. In addition, a coupling device, by means of which the second rotor is coupled to the first rotor, is provided. The actuator furthermore comprises an output element (e.g. threaded nut), which is connected—directly or indirectly—to the second rotor and can be moved axially by means of a rotary motion of the latter. The term "indirect connection" should, for example, be taken to mean that one or more components are interposed in order to convert the rotary motion of the second rotor into an axial motion of the output element.

The coupling device interacts with the first rotor and the second rotor in such a way that, starting from the rest position, an axial movement of the second rotor can be produced by means of a first rotary motion of the first rotor in order to raise the second rotor from the stationary part and thereby bring it into a working position. In the working position of the second rotor, the said rotor can be driven, by means of a second rotary motion of the first rotor or by driving the second rotor relative to the first rotor, so as to perform a rotary motion in order to move the output element axially while the second rotor is substantially stationary in the axial direction.

In the rest position, the second rotor is supported against the stationary part. Axial loads can thus be absorbed in a simple manner while the actuator is not in operation. This relieves loads on the components of the actuator. At least in cases in which an axial force acting towards the stationary part acts continuously on the second rotor (e.g. in a spring or spring/damper device), the—direct or indirect—support for the second rotor against the stationary part makes it unnecessary actively to produce a holding force in order to maintain the rest position. The solution according to the invention can be implemented in a manner that is simple in terms of construction and is therefore inexpensive.

The actuator is configured in such a way that, when there is a demand for actuation, the first rotor first of all ensures release of the support, i.e. the first rotary motion of the first rotor is converted into an axial motion of the second rotor. On completion of the release motion, the second rotor is in the working position. Through jamming or by means of a stop for example, the second rotor is then forced to perform a rotary motion by the second rotary motion of the first rotor in order to move the output element axially. During this process, there is substantially no movement of the second rotor in the axial direction. As an alternative, a rotary motion that displaces the output element axially is imparted to the second rotor by driving it relative to the first rotor. The essential feature in this variant is that a driving action which turns the second rotor can be produced between the two rotors.

In interaction with the two rotors, the coupling device makes possible a suitable connection between the first and the second rotor for the purpose of producing the above-described two-stage mode of action of the actuator according to the invention.

The above-described configuration of the actuator according to the invention has a high operational reliability since reliable support for the second rotor against the stationary part is ensured in the event of a malfunction.

The actuator preferably has a friction device, by means of which the second rotor can be brought into frictional engagement with the stationary part in the rest position in order to fix the second rotor firmly against rotation. The friction device can be arranged on the second rotor or the stationary part or integrated therein, for example. It can be implemented in a simple and effective manner, by means of an appropriate surface treatment of the corresponding component, for example. The friction device not only provides axial support for the second rotor in the state of rest but also security against turning. In contrast to known systems, there is no need to apply an active holding force in order to prevent the second rotor from turning. The entire system remains reliably in its existing position, even when the actuator is damaged. Given appropriate arrangement of the friction device, the frictional force which provides security against turning can be a function of the axial load acting on the actuator.

In order to minimize frictional losses during the operation of the actuator, provision can be made for the second rotor to be released from the friction device in the working position or for the second rotor together with the friction device to be released from the stationary part in the working position.

According to one embodiment, the first and the second rotor are arranged coaxially and, in particular, the second rotor is positioned on the inside of the first rotor in the radial direction, or vice versa. This makes it possible to achieve a compact and robust actuator construction.

The second rotor is preferably supported towards the inside in the radial direction. This means that any transverse forces that occur are dissipated radially inwards.

The second rotor can comprise a threaded spindle, the output element being formed by a threaded nut which interacts with the threaded spindle. A spindle/nut combination of this kind makes it possible to convert a rotary motion of the second rotor into a translation of the output element in an effective manner.

According to an advantageous embodiment of the coupling device, the said coupling device allows a limited rotary motion of the first rotor relative to the second rotor by bringing about an axial relative motion of the first rotor and of the second rotor. In other words, the coupling device is intended to allow an axial relative motion of the two rotors when they are turned relative to one another. However, the ability to turn the rotors relative to one another is limited so as to allow the two-stage mode of operation of the actuator.

The coupling device can comprise at least one ramp, which slopes—relative to a plane normal to the longitudinal axis of the actuator. The slope can be constant or vary along the ramp. The ramps can also be embodied as semicircular or curved tracks. In particular, the ramp interacts with an associated counter surface or counter ramp via a rolling contact element. The ramp is preferably of V-shaped design. A non-sloping section can be provided between the legs of the V or the curved tracks. Thus this ramp has two sections sloping in opposite directions and a free-motion section between them, the latter section extending within a plane normal to the longitudinal axis of the actuator.

According to one embodiment, the coupling device has a first groove associated with the first rotor and a second groove associated with the second rotor, a rolling contact element (e.g. a ball) arranged in the grooves being provided between the first rotor and the second rotor, coupling the first rotor and the second rotor to one another. In particular, the grooves are formed directly on the respective rotor. During turning of the rotors, the rolling contact element runs in the grooves, which act as a kind of "race", and thus establishes mutual coupling of the rotors in the manner of a positive guide.

An axial motion between the rotors can be achieved in a simple manner if at least one of the grooves slopes and/or is curved at least in a certain section or sections relative to a plane normal to the longitudinal axis (A) of the actuator.

The coupling device can have a stop which limits a rotary motion of the first rotor relative to the second rotor. Alternatively or in addition, the coupling device can have a stop which limits a rotary motion of the second rotor relative to the first rotor.

To bring about rotationally rigid coupling of the rotors, one of the rotors can have a shoulder, which can be brought into contact with a flange-type projection on the other rotor by means of the second rotary motion.

According to one embodiment of the actuator according to the invention, not only the second rotor but also the first rotor can be moved in the axial direction.

In particular, the first rotor is mounted on the stationary part or on a component securely connected to the stationary part in a manner which allows rotation—either permanently or temporarily.

According to one embodiment, the first rotor is mounted in a manner which allows limited turning, i.e. it cannot rotate freely through 360° but is limited in its rotary motion to a predetermined angular range. For example, the first rotor has a stop device which interacts with a stop associated with the stationary part in order to limit turning of the first rotor.

The coupling device can comprise a constructional element which is connected in a rotationally fixed and axially displaceable manner to the stationary part or to a component securely connected to the stationary part and which is coupled to the first rotor in such a way that a relative rotation between the first rotor and the constructional element brings about an axial displacement between the first rotor and the constructional element.

Provision can be made for the second rotor to be mounted on the constructional element in such a way as to be effective for axial driving (i.e. in an axially fixed manner or with a driver effect) but freely rotatable in order to produce the desired coupling effect and to make possible a construction which is as compact and robust as possible.

A rolling contact bearing can be arranged between the first rotor and the stationary part or the component securely connected to the stationary part. In embodiments with an axially movable first rotor, provision can be made for the rolling contact bearing on the stationary part to act in the manner of a stop to limit an axial motion of the first rotor. It has proven advantageous, especially in the case of versions of the actuator with an axially movable first rotor, to provide an elastic element, especially a corrugated spring, between the rolling contact bearing and the first rotor in order to compensate for any play that may be present.

A particularly compact construction is obtained if, together with the stator, which is associated with the stationary part, the first rotor forms an electric motor. In particular, the stator is connected in a rotationally fixed manner to the stationary part.

It is also conceivable for at least one functional element associated with the first rotor to form an electric motor together with at least one functional element associated with the second rotor. This embodiment is a simple way of enabling the second rotor to be driven so as to perform a rotary motion by driving it relative to the first rotor when the second rotor is in the working position. The functional elements can be a stator and permanent magnets, for example.

The invention furthermore relates to a spring carrier with a movable spring plate of the type stated at the outset for a spring or spring/damper device on a vehicle, which device has an actuator in accordance with one of the embodiments described above.

The invention furthermore relates to a method for the axial displacement of an output element, in which, starting from a rest position, an axial movement of a second rotor, which is supported against a stationary part in the rest position, is produced by means of a first rotary motion of a first rotor in order to release the second rotor from the stationary part and thereby bring it into a working position. In the working position, the second rotor is driven, by means of a second rotary motion of the first rotor or by driving the second rotor relative to the first rotor, so as to perform a rotary motion in order to move the output element axially while the second rotor is substantially stationary in the axial direction.

According to one embodiment of the method, during the first rotary motion a limited rotary motion of the first rotor takes place relative to the second rotor, by means of which an axial relative motion between the first and the second rotor is produced.

Provision can be made for the second rotor to be moved axially during the first rotary motion until a rotationally rigid coupling has been established between the first and the second rotor.

It is preferable—especially before the second rotor is moved axially—if, during the first rotary motion, the first rotor is moved axially until it strikes against the stationary part.

According to a development of the method, the first and the second rotor can be moved axially in opposite directions during the first rotary motion.

As an alternative to the embodiments of the method which provide rotationally rigid coupling of the two rotors during the second rotary motion, the second rotor can be moved axially during the first rotary motion until a rotationally rigid coupling has been established between the first rotor and the stationary part or a component securely connected to the stationary part.

In particular, once the working position has been reached, the second rotor is driven so as to perform a rotary motion, while the first rotor is held firmly against rotation.

BRIEF DESCRIPTION OF THE DRAWINGS

Further embodiments of the invention are detailed in the subclaims, the description and the figures.

The invention is explained below, purely by way of example, with reference to the figures. In the drawing.

DETAILED DESCRIPTION

Figure 1:
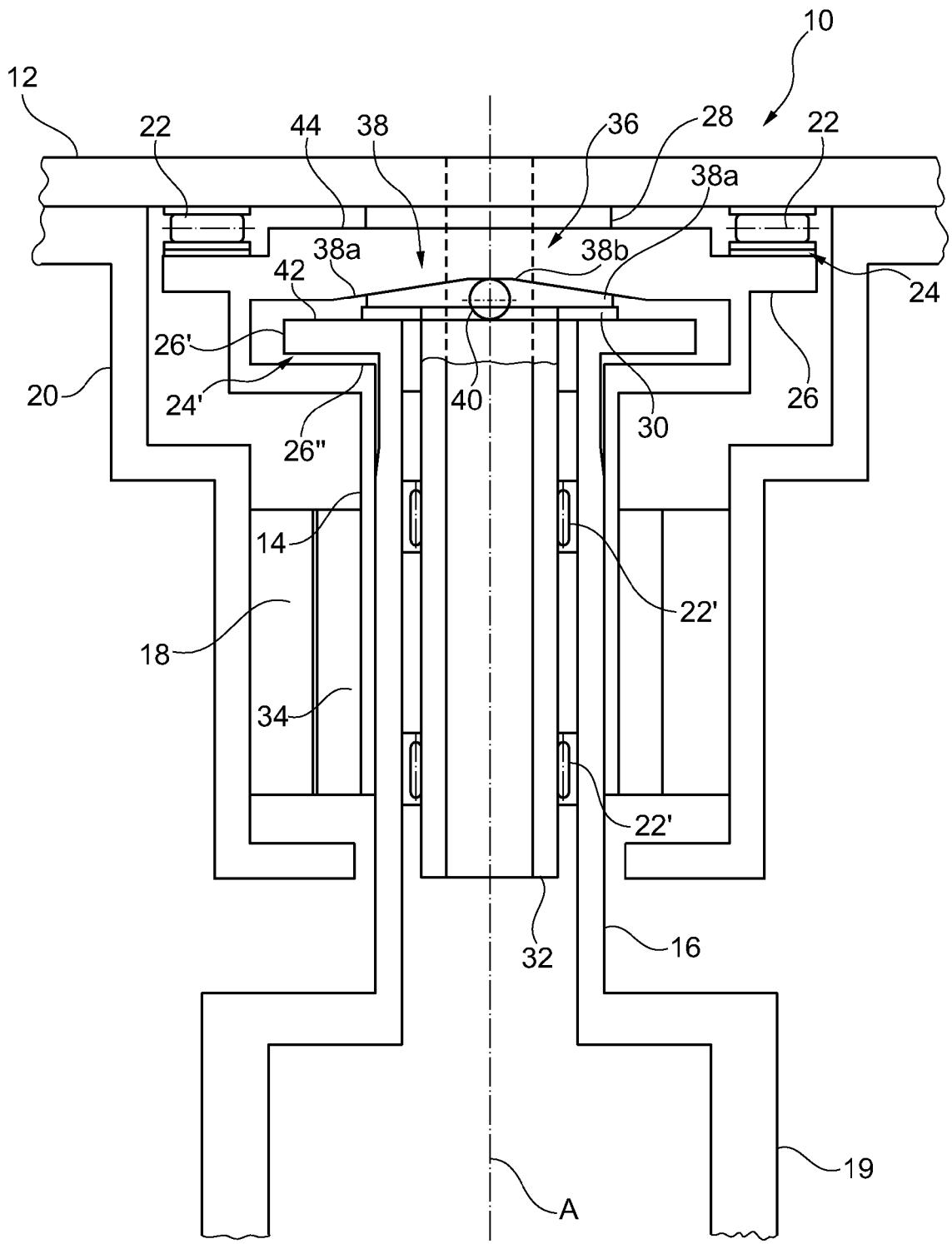
FIG. 1 shows a schematic representation of an embodiment of the actuator according to the invention in the rest position.

FIG. 1 shows an actuator 10, which is a component part of a spring carrier of a spring or spring/damper device on a vehicle (not shown). Those component parts of the spring carrier which are not necessary for an understanding of the actuator 10 are not shown in FIG. 1.

A stationary part 12 of the actuator 10 is connected directly or indirectly to the vehicle. The actuator 10 comprises an outer rotor 14 and an inner rotor 16, which is arranged coaxially within the latter and is connected to a threaded spindle 19 on its side facing away from the stationary part 12. The threaded spindle 19 is connected to an axially movable spring plate by way of a corresponding threaded nut (not shown in FIG. 1) to enable the preload of a spring of the spring carrier to be modified.

A rotary motion of the threaded spindle 19 required for axial movement of the spring plate is produced by the interaction of a stator 18 with permanent magnets 34 of the outer rotor 14. The outer rotor 14 is rotatably mounted in the stator 18. Support for the outer rotor 14 in the axial direction is provided by a bearing 22, which is attached to the stationary part 12. In the rest position of the actuator 10 shown in FIG. 1, however, the outer rotor 14 does not rest against the bearing 22 by means of a stop flange 26. There is thus a clearance 24 between the stop flange 26 of the outer rotor 14 and the bearing 22.

Together, the stator 18 and the outer rotor 14 form an electric motor, which is substantially enclosed by a housing 20. The housing 20 is securely connected to the stationary part 12.

The rotors 14, 16 are mounted in such a way that they can be turned relative to one another. Between the two rotors 14, 16, there is only sliding friction. In principle, it is also possible for a rolling contact bearing to be provided. Driving the outer rotor 14 thus does not lead automatically to driving of the inner rotor 16. For this purpose, coupling of the rotors 14, 16 is required, and this is provided by a coupling device 36.

In the view in FIG. 1, a ramp 38 of the coupling device 36 is visible, the said ramp being formed on the vehicle-facing end section of the outer rotor 14. The ramp 38 has two sloping ramp sections 38a, which are separated from one another by a free-motion section 38b, which extends within a plane normal to a longitudinal axis A of the actuator, which corresponds in turn to the axis of rotation of the rotors 14, 16. The two ramp sections 38a slope in opposite directions and, in the view shown, form a shallow V.

The ramp sections 38a, 38b of the ramp 38 interact with a ball 40, which is also in contact with a vehicle-facing surface 42 of the inner rotor 16. In principle, it is also possible for different rolling contact elements to be used instead of the ball 40.

Figure 2:
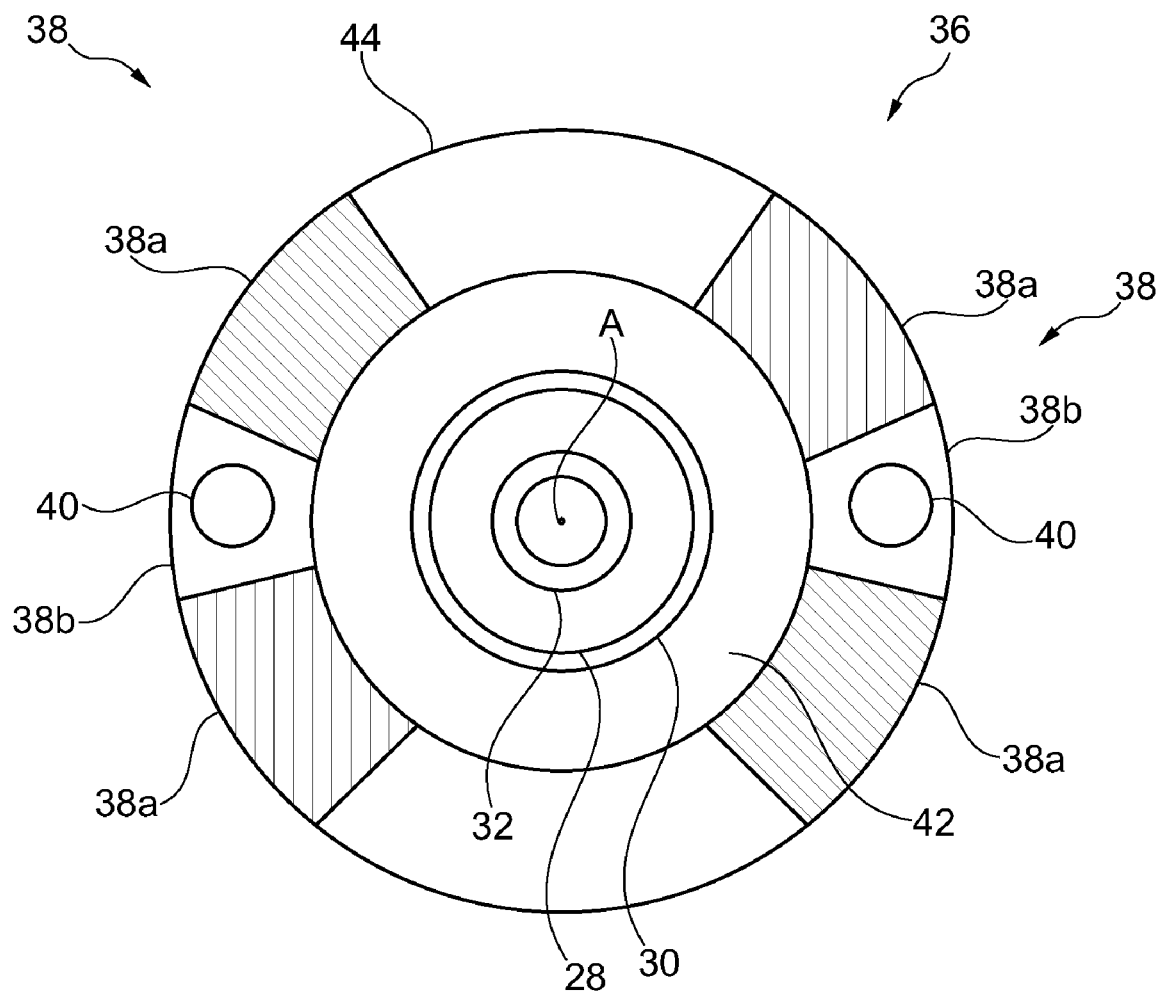
FIG. 2 shows parts of the coupling device of the actuator in FIG. 1 in a plan view (not to scale)

To clarify the configuration of the coupling device 36, the said device is shown in a sectional view along a plane perpendicular to the longitudinal axis A of the actuator in FIG. 2. It is apparent that the coupling device 36 has two ramps 38, which are formed on a ring section 44 (transparent in FIG. 2) on the vehicle-facing end section of the outer rotor 14. In principle, it is possible for any number of ramps 38 to be provided. The sloping ramp sections 38a are shown hatched. The free-motion sections 38b lie between the ramp sections 38a. In the rest position of the actuator 10, the balls 40 associated with the respective ramps 38 are in the region of the free-motion sections 38b (see also FIG. 1).

For an understanding of the elements situated radially within the ring section 44 in FIG. 2, attention is drawn first of all once again to FIG. 1.

In the illustrated rest position of the actuator 10, the inner rotor 16 rests via an end stud 28 against the stationary part 12 and supports the axially acting wheel load against the stationary part 12—and hence indirectly against the vehicle. The end stud 28 is securely connected to the stationary part 12 and extends in the axial direction, starting from the stationary part 12, through the ring section 44 of the outer rotor 14. Via an annular friction facing 30 provided on the vehicle-facing end of the inner rotor 16, the inner rotor 16 is not only supported in the axial direction against the end stud but also secured against turning in the rest position. The greater the wheel load, the greater is the frictional force acting between the end stud 28 and the inner rotor 16, i.e. the security against turning increases with increasing wheel load. As already described above, the inner rotor 16 is arranged in such a way that it can turn relative to the outer rotor 14. A supporting tube 32, which serves for the support and mounting of the inner rotor 16, is provided concentrically within the inner rotor 16. Bearings 22' are provided for this purpose. The supporting tube 32 is securely connected to the stationary part 12.

The end stud 28 and the supporting tube 32 are also shown in FIG. 2. The friction facing 30 provided on the inner rotor 16 has a larger outside diameter than the end stud 28 and therefore appears as a narrow ring around the periphery of the end stud 28 in this view. The inside diameter of the annular friction facing 30 is concealed by the end stud 28. Further details of the surface 42 of the inner rotor 16 are not shown to preserve the clarity of the illustration. For example, an annular groove can be provided on the surface 42 in order to prevent radial movement of the balls. A corresponding groove can also be provided in the region of the ramps 38.

In the case of FIG. 2, it should be noted that it is intended only to clarify the principle of operation of the coupling device 36. It is not a true-to-scale section through the embodiment of the actuator 10 of FIGS. 1, 3 and 4.

The mode of operation of the actuator 10 will now be explained below.

Figure 3:
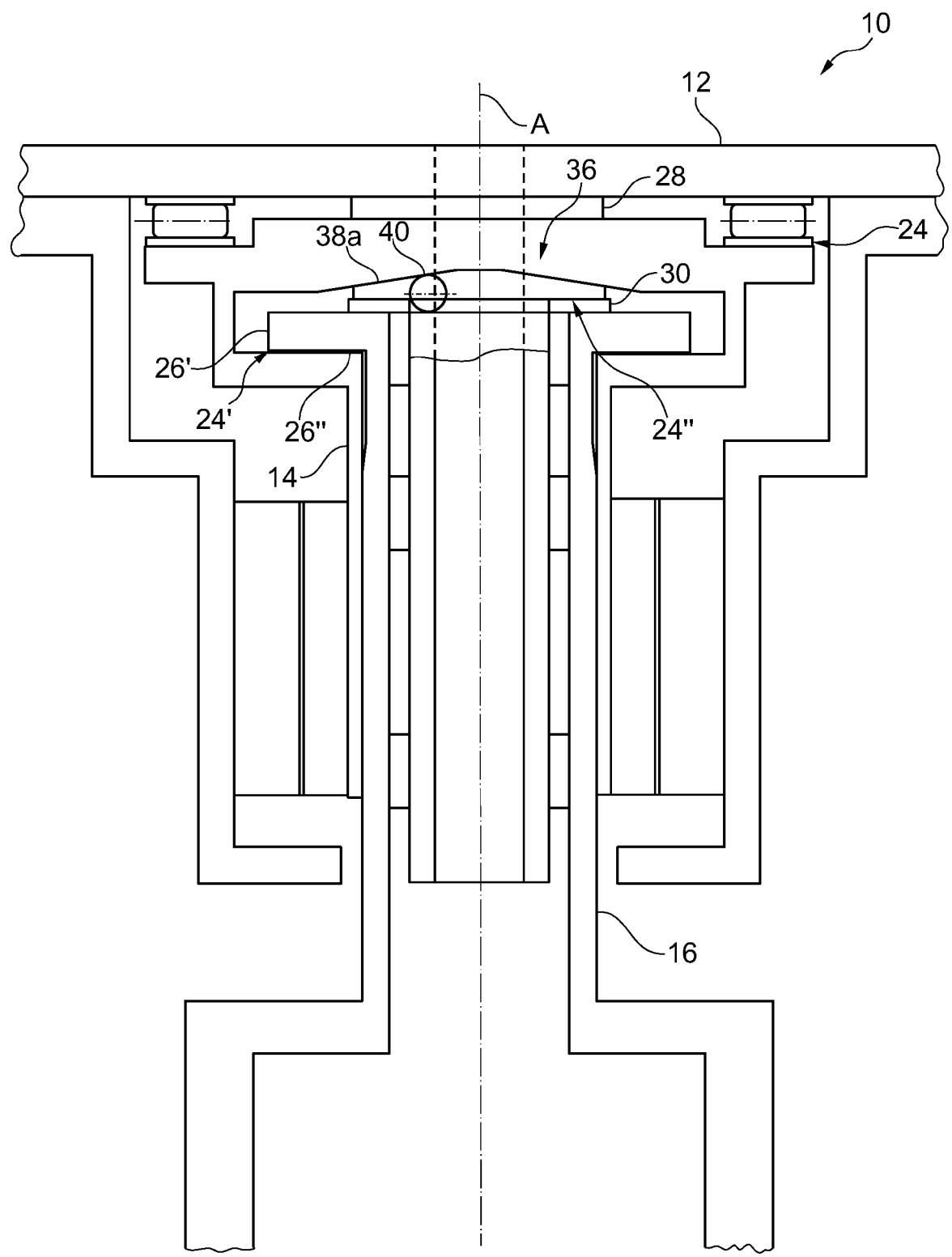
FIG. 3 shows the actuator of FIG. 1 in an intermediate position.

Starting from the rest position shown in FIG. 1, in which the balls 40 are arranged in the region of the respective free-motion sections 38b and in which there is a clearance 24 between the stop flange 26 of the outer rotor 14 and the bearing 22 and a clearance 24' between a stop flange 26' of the inner rotor 16 and a stop shoulder 26" of the outer rotor 14, the outer rotor 14 is excited into rotation by the stator 18. In this situation, the inner rotor 16 is supported in an axially fixed and rotationally fixed manner on the end stud 28 and is therefore not set in rotation. Owing to the relative turning motion between the outer rotor 14 and the inner rotor 16, the balls 40 enter one of the sloping ramp regions 38a, thereby producing a force acting in the axial direction between the two rotors 14, 16. Since the wheel load is acting on the inner rotor 16, the said rotor is initially not displaced axially. The axial force produced by the coupling device 36 consequently pushes the outer rotor 14 in the axial direction towards the stationary part 12 until the clearance 24 between the bearing 22 and the stop flange 26 has been overcome. This situation is shown in FIG. 3 (intermediate position). However, there is still a clearance 24' between the stop flange 26' of the inner rotor 16 and the stop shoulder 26" of the outer rotor 14. This means that it is still possible for the two rotors 14, 16 to be turned relative to one another.

In other words, the outer rotor 14 was moved axially to a small extent in the direction of the stationary part 12 through the action of the coupling device 36 until this motion was terminated in the axial direction. Further turning of the two outer rotors 14, 16 relative to one another then leads to an axial motion of the inner rotor 16 in the opposite direction, and, as a result, the inner rotor separates/rises from the end stud 28. In the state shown in FIG. 3, lift-off has already begun and a small clearance 24" has already formed between the end stud 28 and the friction facing 30. With the formation of the clearance 24", the inner rotor 16 is no longer supported in the axial direction and, as a result, the holding force with its anti-turn effect then disappears. This means that the inner rotor 16 can now be turned. However, there is as yet no coupling between the outer rotor 14, which is being driven in rotation, and the inner rotor 16 (intermediate position). This state is reached only when further turning of the outer rotor 14 causes the inner rotor 16 to be displaced axially to such an extent through the action of the coupling device 36 that the clearance 24' is completely overcome and the stop flange 26' of the inner rotor 16 rests against the stop shoulder 26" of the outer rotor 14.

Figure 4:
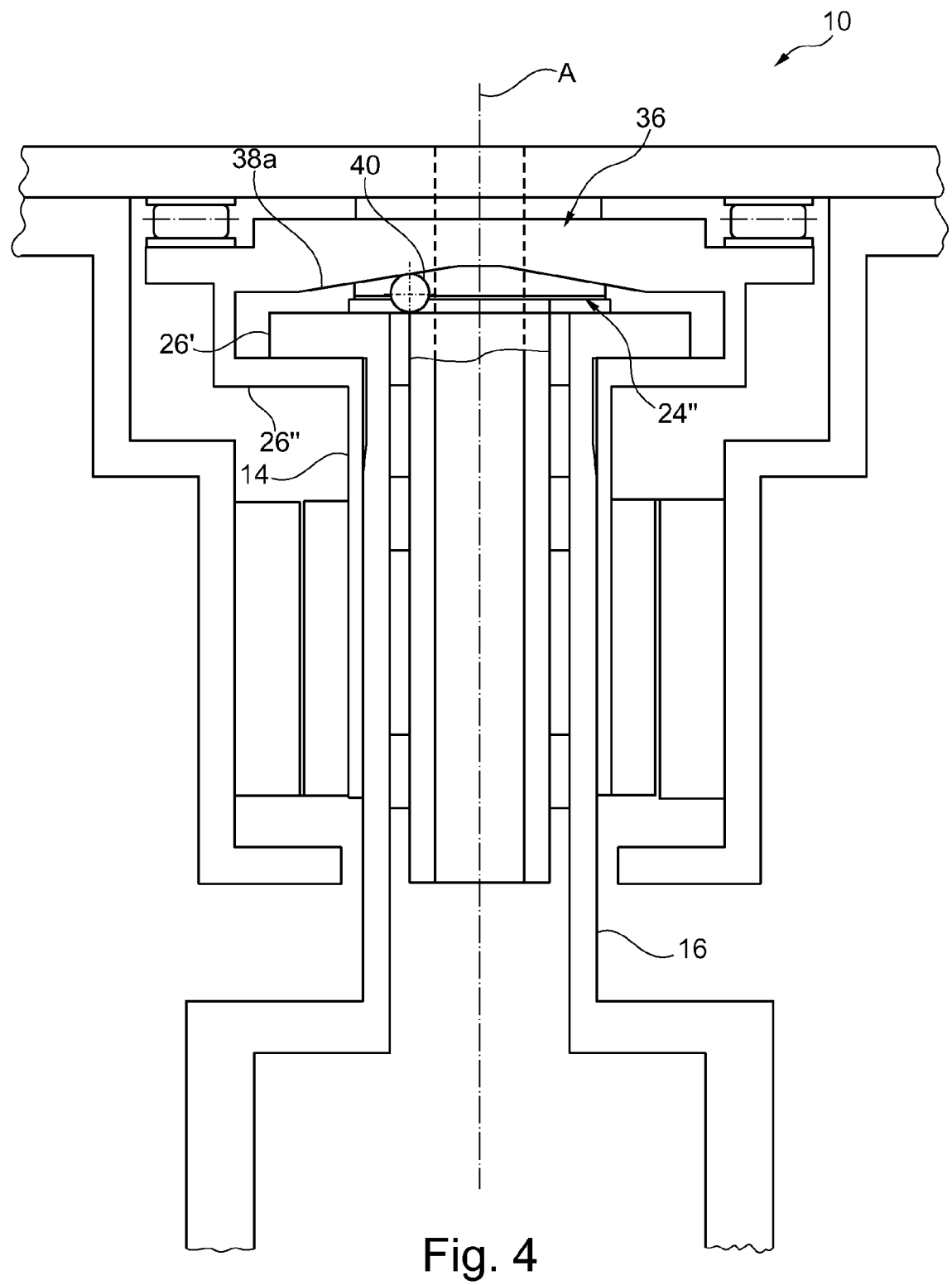
FIG. 4 shows the actuator of FIGS. 1 and 2 in the working position.

This situation is shown in FIG. 4 (working position). The coupling device now produces such a strong axial force between the two rotors 14, 16 that they are coupled to one another in a rotationally rigid manner. The rotary motion of the outer rotor 14 is then transmitted to the inner rotor 16, as a result of which the threaded spindle 19 is also forced to perform a rotary motion. The rotary motion of the threaded spindle 19 is converted into an axial motion by means of a threaded nut (not shown) in a manner known per se.

Once the desired axial offset of the threaded nut—and hence of the spring plate—has been achieved, the energy supply to the stator 18 is interrupted. The wheel load acting on the threaded spindle 19 and hence on the inner rotor 16 continues to act on the outer rotor 14 via the coupling device 36. Since the now deenergized motor poses only a slight resistance to turning of the outer rotor 14, the outer rotor 14 is automatically turned relative to the inner rotor 16 through the action of the coupling device 36 until the balls 40 are once again in the region of their respectively associated free-motion sections 38b. This means that the inner rotor 16 moves automatically in the axial direction until it strikes against the end stud 28 and is once again supported reliably in an axially and rotationally fixed manner. The coupling between the rotors 14, 16 is then released again. The actuator is thus back in the rest position shown in FIG. 1. This reset motion also occurs if the actuator 10 fails.

It should be noted that an embodiment in which the outer rotor 14 is initially not moved in the axial direction is also possible in principle. This means that it is already in contact with the bearing 22 in the rest position and that a rotary motion of the outer rotor 14 leads immediately to an axial motion of the inner rotor 16 when the free-motion angle defined by the free-motion sections 38b is exceeded. Ultimately, the only point of essential significance is that the actuator 10 should have a two-stage mode of operation: the first stage comprises decoupling of the inner rotor 16 from the stationary part 12 to enable the former to be turned. The second stage comprises coupling the two rotors 14, 16 in order to transmit the rotary motion of the outer rotor 14 to the inner rotor 16 and hence to produce an axial displacement via the threaded spindle 19 and the threaded nut.

In contrast to the embodiment illustrated, the sloping ramp sections 38a of the ramp 38 can also be formed on the inner rotor 16. An embodiment in which sloping ramp sections 38a are provided both on the inner rotor 16 and on the outer rotor 14 can also be advantageous in certain cases.

The above-described mode of operation of the actuator 10 according to the invention also makes clear the advantages thereof. On the one hand, a "fail-safe" function is provided since support for the inner rotor 16 against a stationary component is automatically ensured if the drive of the actuator 10 fails. In other words, active intervention is not required to ensure return from the working position into the secured rest position. On the other hand, there is no need to apply an active holding force in the rest position in order to prevent unwanted turning of the inner rotor 16 and hence axial displacement of the spring plate connected to the actuator 10.

Although the concept according to the invention has been described using as an example an actuator for a spring carrier, it should be noted that the actuator is fundamentally suitable for a large number of uses, especially when the force acting externally on the actuator always acts in the same direction, i.e. when there are substantially no load reversals.

Figure 5:
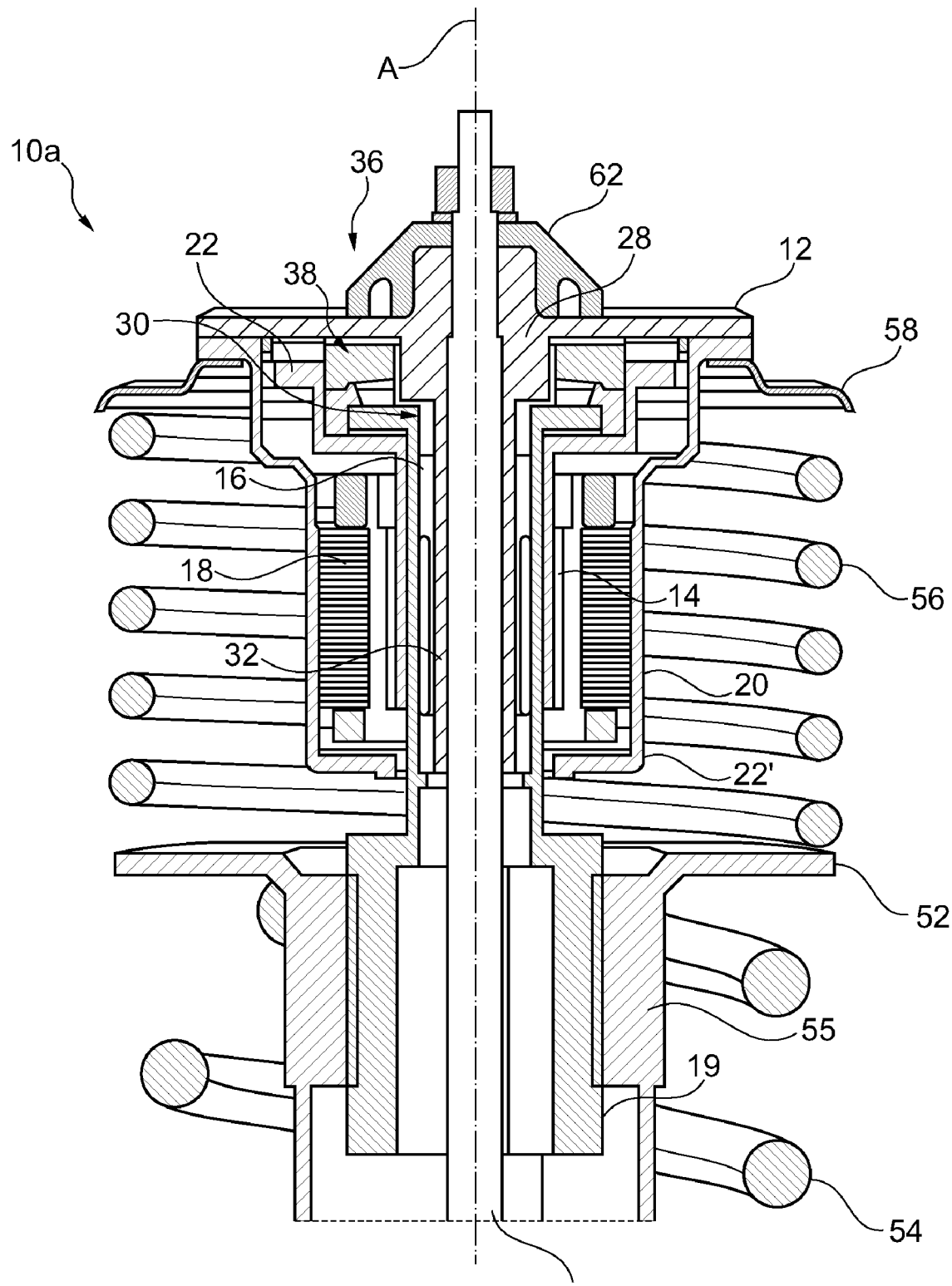
FIG. 5 shows a second illustrative embodiment of the actuator according to the invention.

FIG. 5 shows another embodiment 10a of the actuator according to the invention, which is used in a spring carrier 50. Only a vehicle-facing part of the spring carrier 50 containing the actuator 10a is shown. The spring carrier 50 has an upper spring plate 52, which is associated with a lower spring plate (not shown). A coil spring 54, the preload of which can be modified by means of an axial motion of the upper spring plate 52, is arranged between the spring plate 52 and the lower spring plate. The possibility of level control is provided through the action of a rotary motion of the threaded spindle 19 in interaction with a threaded nut 55 connected to the spring plate 52. To reduce the load acting on the thread of the threaded spindle 19 and of the threaded nut 55, a relief spring 56 is provided, the said spring extending between the spring plate 52 and a relief spring plate 58, which is connected to the housing 20.

Actuator 10a corresponds substantially to actuator 10, for which reason the same reference signs are used. One difference is that the supporting tube 32, the end stud 28 and the stationary part 12 are of one-piece design. Extending through the supporting tube 32 is a piston rod 60 of the spring carrier. Also provided is a connection piece 62 for the purpose of establishing a connection between the spring carrier 50 and the vehicle (not shown).

Figure 6:
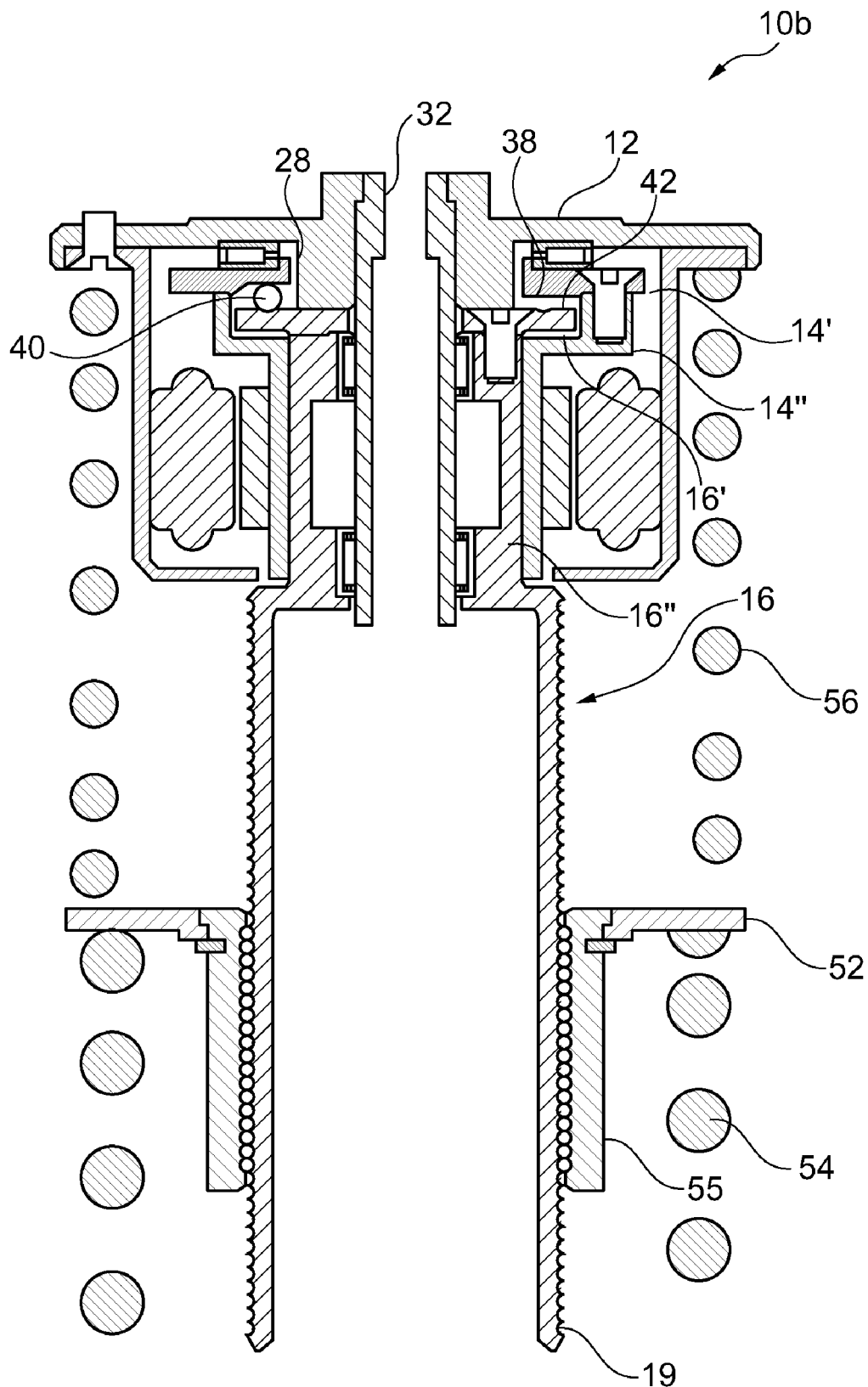
FIG. 6 shows a third illustrative embodiment of the actuator according to the invention.

FIG. 6 shows a further embodiment 10b of the actuator according to the invention. The production-optimized embodiment shown here once again illustrates the configuration of the coupling device 36 with a ball 40 which is arranged between the ramp 38 of the outer rotor 14 and the surface 42 of the inner rotor 16. An embodiment with three balls 40 and three ramps 38 is preferred. The rotors 14, 16 are of two-part design in order to facilitate assembly. They comprise end plates 14', 16', which are releasably connected (screwed) to rotor bodies 14", 16". In contrast to the actuator 10a of FIG. 5, the supporting tube 32 and the stationary part 12 are separate components. The end stud 28 is formed on the stationary part 12. The spring plate 52 and the threaded nut 55 are also separate components.

It should be noted that only the adjusting mechanism is depicted here. Any peripheral components and the connection to the vehicle are not shown.

Figure 7:
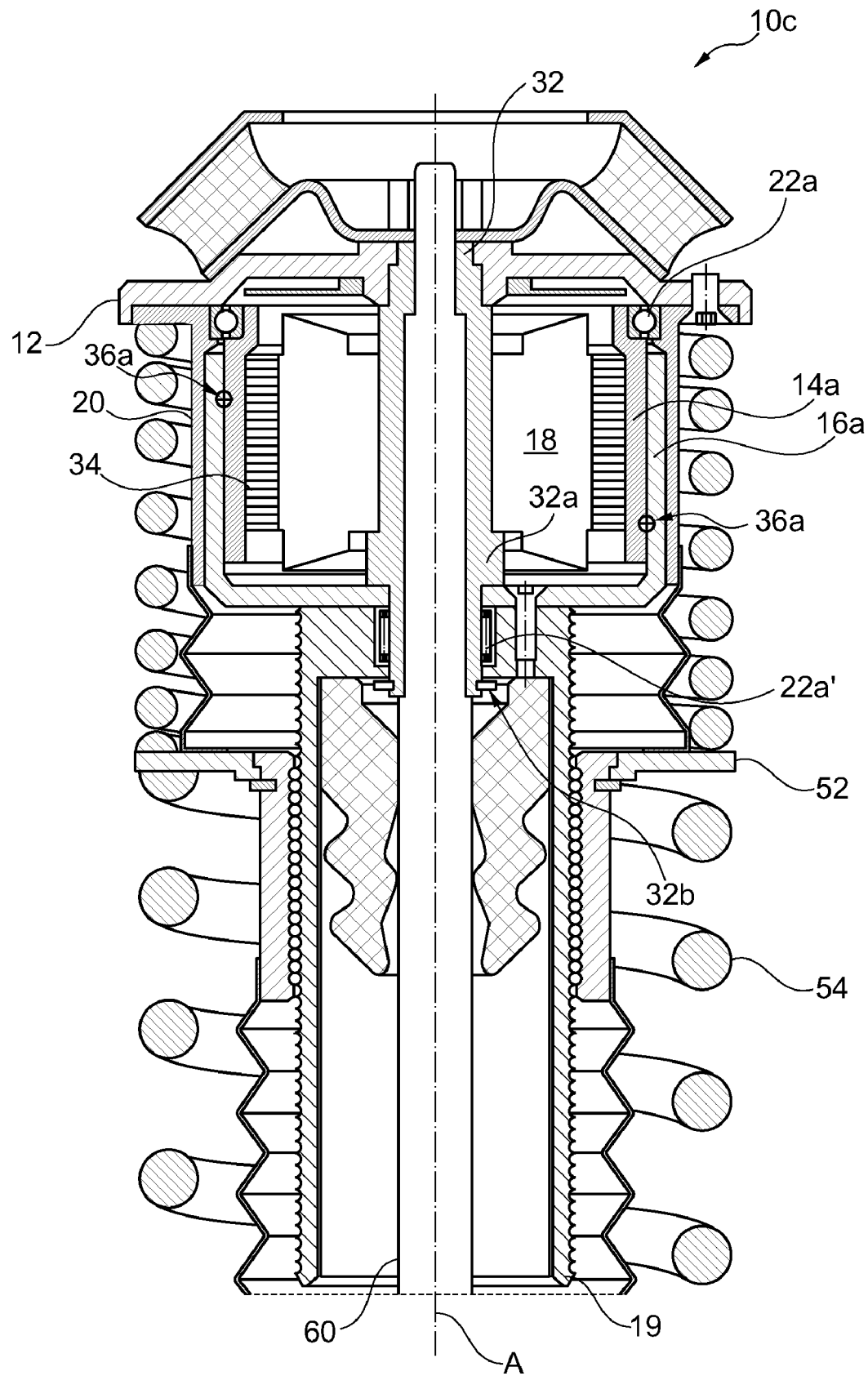
FIG. 7 shows a fourth illustrative embodiment of the actuator according to the invention.

FIG. 7 shows a further embodiment 10c of the actuator according to the invention. Actuator 10c comprises a primary rotor 14a and a secondary rotor 16a, which is arranged coaxially on the outside of the latter in the radial direction and, on its side facing away from a stationary part 12, is connected to a threaded spindle 19 which—as in the embodiments 10, 10a, 10b described above—serves to produce an axial displacement of a spring plate 52. An electric motor comprising a stator 18 and the primary rotor 14a with permanent magnets 34 is to a large extent accommodated by that end of the secondary rotor 16a which faces the stationary part 12. Radially on the outside, this part of the secondary rotor 16a is in turn surrounded by a housing 20, which is securely connected to the stationary part 12.

A rotary motion of the threaded spindle 19 required for axial movement of the spring plate 52 is made possible by the electric motor already described (preferably a brushless DC motor). The primary rotor 14a is mounted rotatably in the housing 20 by means of a bearing 22a. The stator 18, by contrast, is arranged in a rotationally fixed manner on a supporting tube 32, which is in turn connected in a rotationally fixed and axially fixed manner to the stationary part 12. In contrast, the secondary rotor 16a is mounted rotatably, by means of a bearing 22a', on an end of the supporting tube 32 which faces away from the stationary part 12.

In the rest position of the actuator 10c, axial support for the secondary rotor 16a is provided by way of a shoulder section 32a of the supporting tube 32, which—as already mentioned—is securely connected to the stationary part 12. In other words, the force attributable to the weight of the vehicle body acting on the actuator 10c is transmitted via the stationary part 12 and the supporting tube 32 from the shoulder section 32a to the secondary rotor 16a, which ultimately transmits it via the spindle 19 to the spring plate 52. In this situation, the secondary rotor 16a is thus supported in the axial direction only against a component that is substantially fixed with respect to the vehicle. Owing to the supporting force acting between the shoulder section 32a and a complementary shoulder on the secondary rotor 16a and to the frictional engagement thus effected, the secondary rotor 16a is also secured against turning. Security against turning is improved if friction devices are formed or arranged on the shoulder section 32a and/or the complementary shoulder of the secondary rotor 16a.

As already indicated above, the rotors 14a, 16a are fundamentally mounted in such a way that they can be turned relative to one another. Driving the primary rotor 14a thus does not lead automatically to driving of the secondary rotor 16a. In order to achieve two-phase actuation, in which decoupling of the secondary rotor 16a from the stationary part 12 takes place in the first phase and turning of the secondary rotor 16a takes place in the second phase, a coupling device 36a is provided, being arranged substantially between the rotors 14a, 16a in the radial direction—as seen in relation to the longitudinal axis A of the actuator. The mode of operation of the coupling device 36a will be explained in greater detail below with reference to FIGS. 8a and 8b.

In order to change the axial position of the spring plate 52 to modify the preload of a spring 54, the stator 18 is first of all energized, thereby imparting a rotary motion to the primary rotor 14a. By means of the coupling device 36a described in detail below, the rotation of the primary rotor 14a is converted into an axial displacement/an axial offset of the secondary rotor 16a away from the stationary part 12, and the secondary rotor 16a separates from the shoulder section 32a. As a result, the loading on the actuator 10c also acts on the primary rotor 14a, which is supported in an upward direction against the stationary part 12 via the bearing 22a.

Up to this point in time, the secondary rotor 16a has essentially still not been excited into a rotary motion since, on the one hand, the coupling between the shoulder section 32a and the secondary rotor 16a has prevented a rotary motion owing to the continued action of the axial loads and, on the other hand, the coupling device 36a is designed such that the rotary motion of the primary rotor 14a does not cause a rotary motion of the secondary rotor 16a, at least initially (intermediate position).

When the shoulder section 32a and the secondary rotor 16a are decoupled, the securing of the secondary rotor 16a against turning is canceled and the said rotor can now fundamentally follow a rotary motion of the primary rotor 14a. For this purpose, the two rotors 14a, 16a are coupled to one another in a rotationally rigid manner during the continued rotation of the primary rotor 14a. In a coupled state of the rotors 14a, 16a (working position), they rotate together and the spring plate 52 is moved axially by the desired amount with the aid of the rotation of the spindle 19.

Once the desired axial offset has been achieved, the energy supply to the stator 18 is interrupted. The wheel load acting on the threaded spindle 19 and hence also on the secondary rotor 16a continues to act on the primary rotor 14a via the coupling device 36a. Since the now deenergized motor can pose only a negligible resistance to turning of the primary rotor 14a, the said rotor is automatically turned relative to the secondary rotor 16a through the action of the coupling device 36a until the rest position is reached again. Automatic resetting is thus achieved, and this takes place even if the actuator 10c fails ("fail-safe" function).

The mode of action of the coupling device 36a will be explained below with reference to FIGS. 8a and 8b.

Figure 8A:
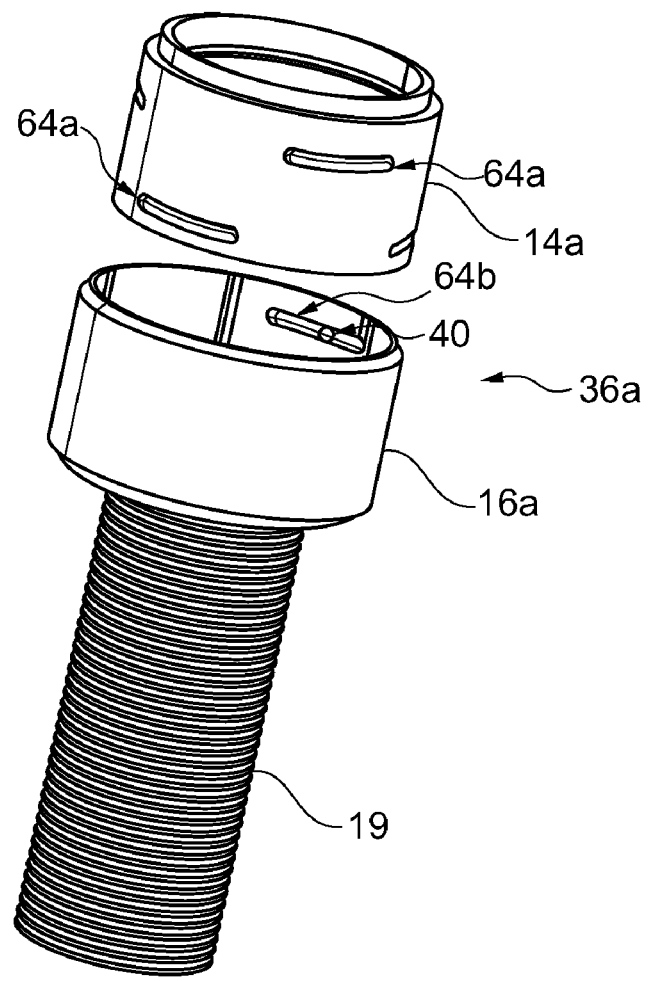
FIGS. 8a and 8b show an exploded representation and a sectional representation, respectively, of a part of the illustrative embodiment of FIG. 7.

FIG. 8a shows an exploded view of the rotors 14a, 16a. The coupling device 36a comprises grooves 64a arranged on the radial outside of the primary rotor 14a, with each of which grooves corresponding grooves 64b on the radial inside of the secondary rotor 16a are associated. Balls 40 are arranged in the grooves 64a, 64b. The grooves 64a, 64b thus define "races" for the balls 40, the said races on the one hand providing support between the rotors 14a, 16a and, on the other hand, producing an axial displacement of the rotors 14a, 16a relative to one another during relative turning, owing to the shaping of the grooves 64a, 64b.

Figure 8B:
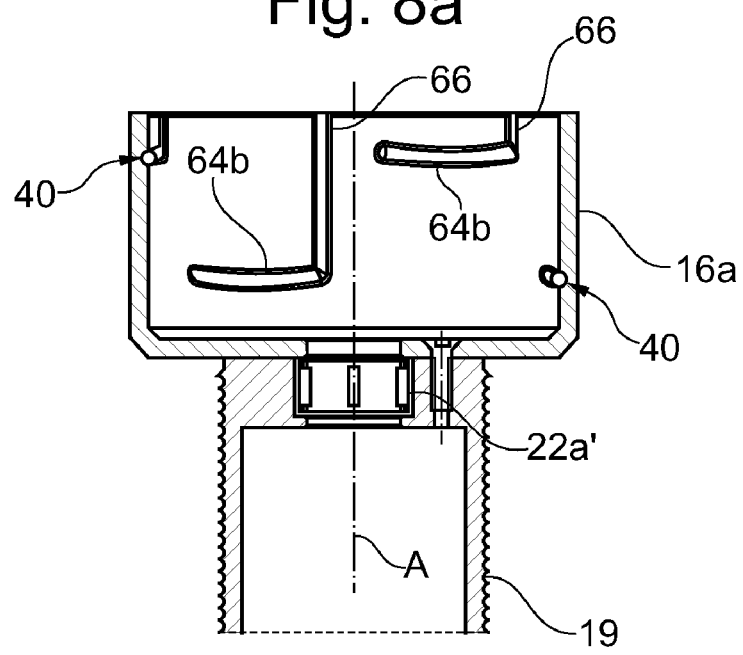

FIG. 8b shows the secondary rotor 16a in a sectional representation in order to clarify the shape of the grooves 64b. Grooves 64b have a slightly curved shape as seen in the axial direction, while grooves 64a extend substantially in the circumferential direction of the rotor 14a. Although the maximum axial offset that can be produced is comparatively small owing to the slight "curvature"/"bend" of grooves 64b, a large offset is not required in any case since even a slight axial offset of the two rotors 14a, 14b is sufficient to release the secondary rotor 16a from the shoulder section 32a and hence prepare it for turning.

Although the maximum axial offset of the secondary rotor 16a that can be produced is defined by the coupling device 36a (e.g. by the amount of an axial component of extension of the grooves 64b), a retaining ring 32b acting as an axial stop and attached to the lower end of the supporting tube 32 is provided for the sake of safety (see FIG. 7).

The length of the grooves 64a, 64b defines the maximum turning angle between the two rotors 14a, 16b before they are coupled to one another in a rotationally rigid manner. Their length is thus decisive inter alia in determining how long an intermediate position is occupied, in which, although the secondary rotor 16a is separated from the shoulder section 32a, no turning has yet started.

For the purpose of assembly, assembly grooves 66 connected to grooves 64b are provided on the radial inside of the secondary rotor 16a. It is self-evident that they can in principle also be provided on the primary rotor 14a in a reversal of the assembly method described below. To assemble the version illustrated, the balls 40 are inserted into the grooves 64a provided for them in the primary rotor 14a and are introduced together with the latter into the secondary rotor 16a, being guided downwards in the respective assembly grooves 66 associated with them.

Figure 9:
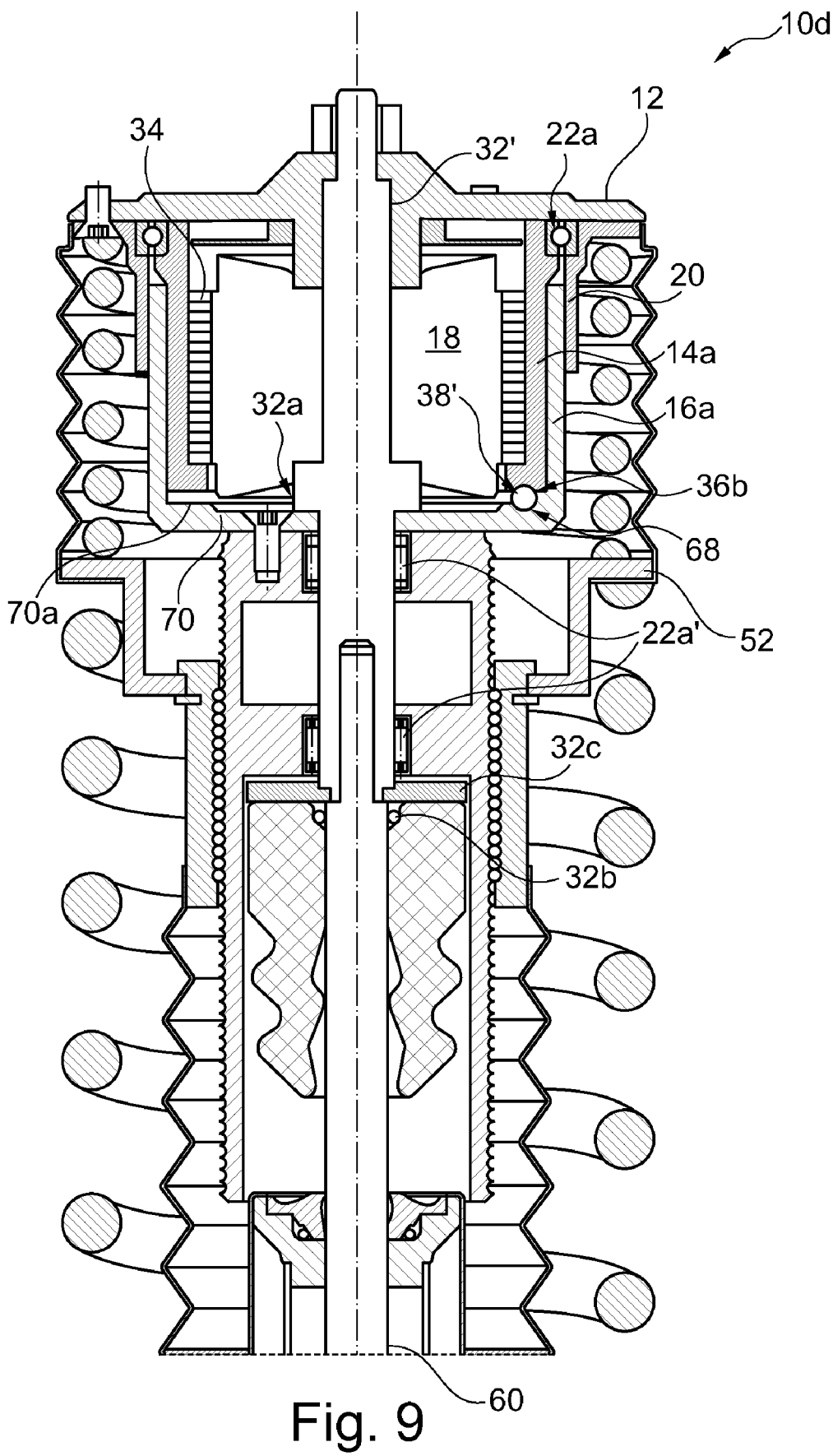
FIG. 9 shows a fifth illustrative embodiment of the actuator according to the invention.

FIG. 9 shows an embodiment 10d of the actuator which is similar in many respects to embodiment 10c. Thus axial support for the secondary rotor 16a in the rest position is likewise provided by a shoulder section 32a formed on a supporting tube 32'. In contrast to the supporting tube 32 of actuator 32c, however, this is of largely solid construction and thus does not allow a piston rod 60 to be inserted completely through the supporting tube 32'. On the contrary, the piston rod 60 is inserted from below into a recess in the supporting tube 32'. To increase the stability of radial support for the secondary rotor 16a, two bearings 22a' arranged offset in the axial direction are provided. The secondary rotor 16a is secured axially by means of a supporting plate 32c, which is in turn secured by a retaining ring 32b. The primary rotor 14a is mounted rotatably, by means of a bearing 22a, in a housing 20 securely connected to a stationary part 12 of the actuator 10d.

One significant difference between actuators 10c and 10d is that a coupling device 36b of actuator 10d is not provided between a radial outer wall of the primary rotor 14a and a radial inner wall of the secondary rotor 16a but is arranged between the two components mentioned in the axial direction. The coupling device 36b comprises a ramp mechanism similar to that for actuators 10 to 10b. This mechanism will be described in detail below with reference to FIGS. 10a and 10b.

Figure 10A:
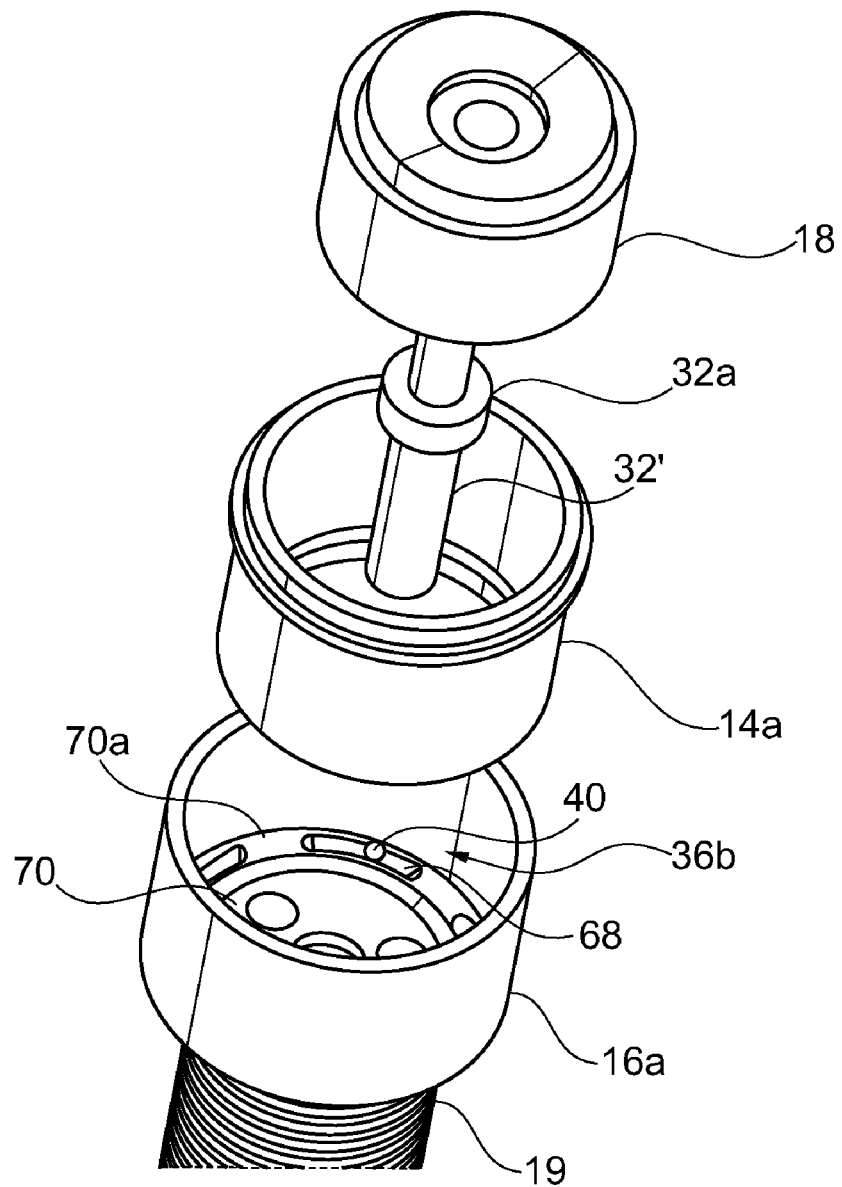
FIGS. 10a and 10b show an exploded representation and a sectional representation, respectively, of part of the illustrative embodiment of FIG. 9.
Figure 10B:
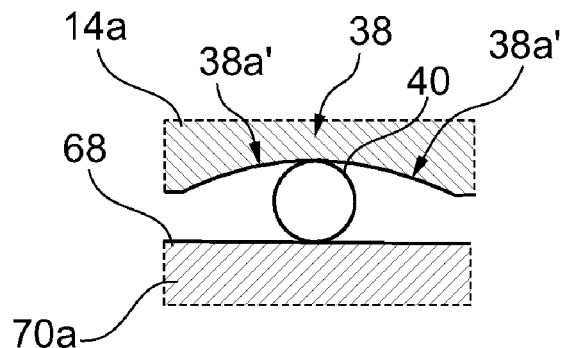

FIG. 10a shows an exploded representation of part of actuator 10d, the stator 18, part of the supporting tube 32' with the shoulder section 32a arranged thereon, and the rotors 14a, 16a being visible.

The coupling device 36b of actuator 10d comprises balls 40, which are arranged in grooves 68. The grooves 68 are arranged on an upper side of an annular section 70a of an intermediate plate 70 of the secondary rotor 16a. They define limited angular segments in the circumferential direction of the annular section 70a of the intermediate plate 70. On the primary rotor 14a, each of the individual grooves 68 is associated with a respective ramp 38' having curved ramp sections 38a' (see FIG. 10b). When the rotors 14a, 16a are turned relative to one another, the balls 40 can be moved in the grooves 68 until they reach the respective end of the grooves 68. Owing to the effect of the ramp sections 38a', a further rotation leads to an axial offset between the two rotors 14a, 16a. The action of the ramp 38' thus corresponds substantially to that of the ramp 38 in actuators 10 to 10b. It is self-evident that the ramp 38' can also be associated with the intermediate plate 70, in which case the grooves 68 are then formed on the primary rotor 14a.

This construction as described is distinguished by being particularly robust and simple to assemble.

The mode of operation of actuator 10d is fundamentally similar to the modes of operation of actuators 10 to 10c since, in the first phase of actuation, only one of the rotors 14, 14a is rotated while the other rotor 16, 16a is displaced axially. After a sufficiently large axial displacement of the rotor 16, 16a, the rotors 14, 14a and 16, 16a are coupled to one another in a rotationally rigid manner in order to move the spring plate 52.

Figure 11:
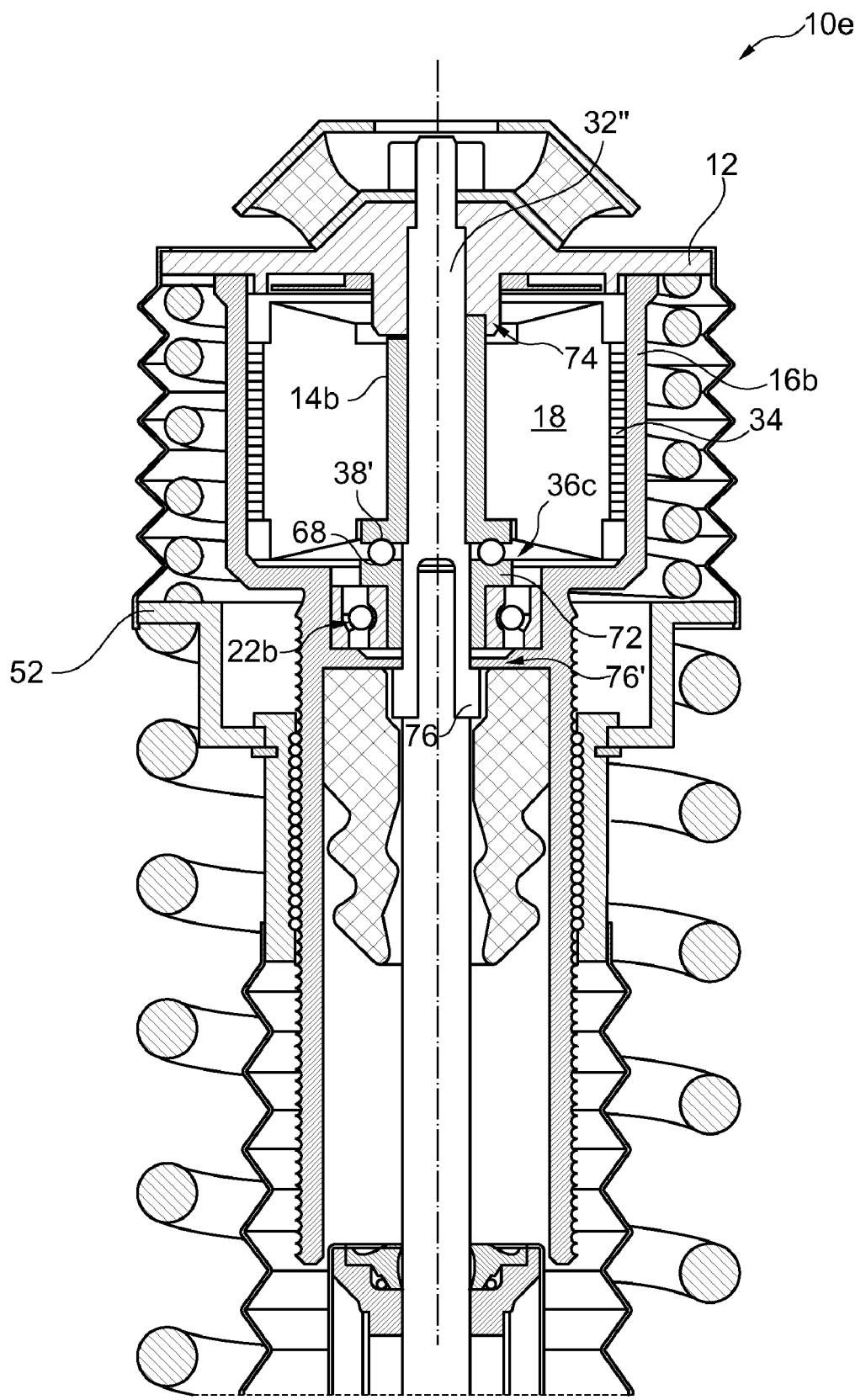
FIG. 11 shows a sixth illustrative embodiment of the actuator according to the invention.

A further embodiment 10e of the actuator is shown in FIG. 11. Actuator 10e also comprises an electric motor for moving a spring plate 52. Its permanent magnets 34 are arranged on a rotor 16b which is supported axially against a stationary part 12 in a rest position of the actuator 10e. A stator 18 of the electric motor is arranged in a rotationally fixed manner on a stator sleeve 14b, which is in turn mounted on a supporting tube 32" in such a way that it can be turned through a certain angle.

To this extent, the stator 18 can be regarded as a first rotor, while rotor 16b forms a second rotor.

The stator sleeve 14b forms part of a coupling device 36c, which has a ramp mechanism similar to that of coupling device 36b in actuator 10d. The coupling device 36c of actuator 10e comprises ramps 38' formed on the stator sleeve 14b and grooves 68 associated therewith (see FIG. 10b). The grooves 68 are formed on a lifting sleeve 72, which is arranged in a rotationally fixed and axially displaceable manner on the supporting tube 32" and forms part of the coupling device 36c. The lifting sleeve 72 supports the rotor 16b by way of a bearing 22b in a manner which allows rotation and supports it radially towards the inside.

In the rest position, the rotor 16b rests against the stationary part 12 and is supported against the latter in the axial direction. In order to move the actuator 10e into an intermediate position, the stator 18 is energized. Since the rotor 16b is pressed against the stationary part 12 owing to the vehicle load acting upon it, and is thereby secured firmly against rotation, the stator 18 is excited into a rotary motion together with the stator sleeve 14b. This rotary motion is converted, by an interaction, already described several times above, between the ramps 38', the balls 40 and the grooves 68, into an axial offset of the lifting sleeve 72, which is transmitted via the bearing 22b to the rotor 16b, which separates from the stationary part 12 as a result. Owing to the rotation of the stator 18 and the axial movement of the rotor 16b resulting therefrom, the latter is now in an intermediate position.

Turning of the rotor 16b is made possible by the fact that the stator sleeve 14b strikes by means of stop sections 74 against corresponding stops on the stationary part 12. A further rotation of the stator 18 is then no longer possible, and the rotor 16b, which is at this point in time no longer fixed on the stationary part 12, is driven to perform a rotary motion which ultimately leads to the desired axial displacement of the spring plate 52.

Thus, in actuator 10e, rotationally rigid coupling between two rotors is not produced in the course of actuation; instead a limited ability for turning of the stator 18 is provided. Initially, therefore, the rotor 16b acts as a "stator", while the stator 18 assumes the function of a "rotor" until its rotary motion is terminated. From this point in time, the rotor 16b and the stator 18 exchange functional roles. In other words, during actuation of actuator 10e only the stator 18 and the stator sleeve 14b rotate in the first phase of actuation, while only the rotor 16b is excited to perform a rotary motion in the second phase of actuation.

On completion of the process of adjusting the spring plate 52, the energization of the stator 18 is canceled, as a result of which the stator sleeve 14b is turned back into the initial position by means of the threaded spindle 19 and the lifting sleeve 72 since the deenergized motor does not pose any significant resistance that would oppose this movement. The said process continues until the rotor 16b is again resting against the stationary part 12 and is supported in the axial direction against the stationary part 12 and is therefore furthermore secured in a rotationally fixed manner again.

At its end remote from the stationary part 12, the supporting tube 32" has a stop shoulder 76, which interacts with a complementary stop shoulder 76' on the rotor 16b in order to limit the maximum axial displacement of the latter.

Figure 12:
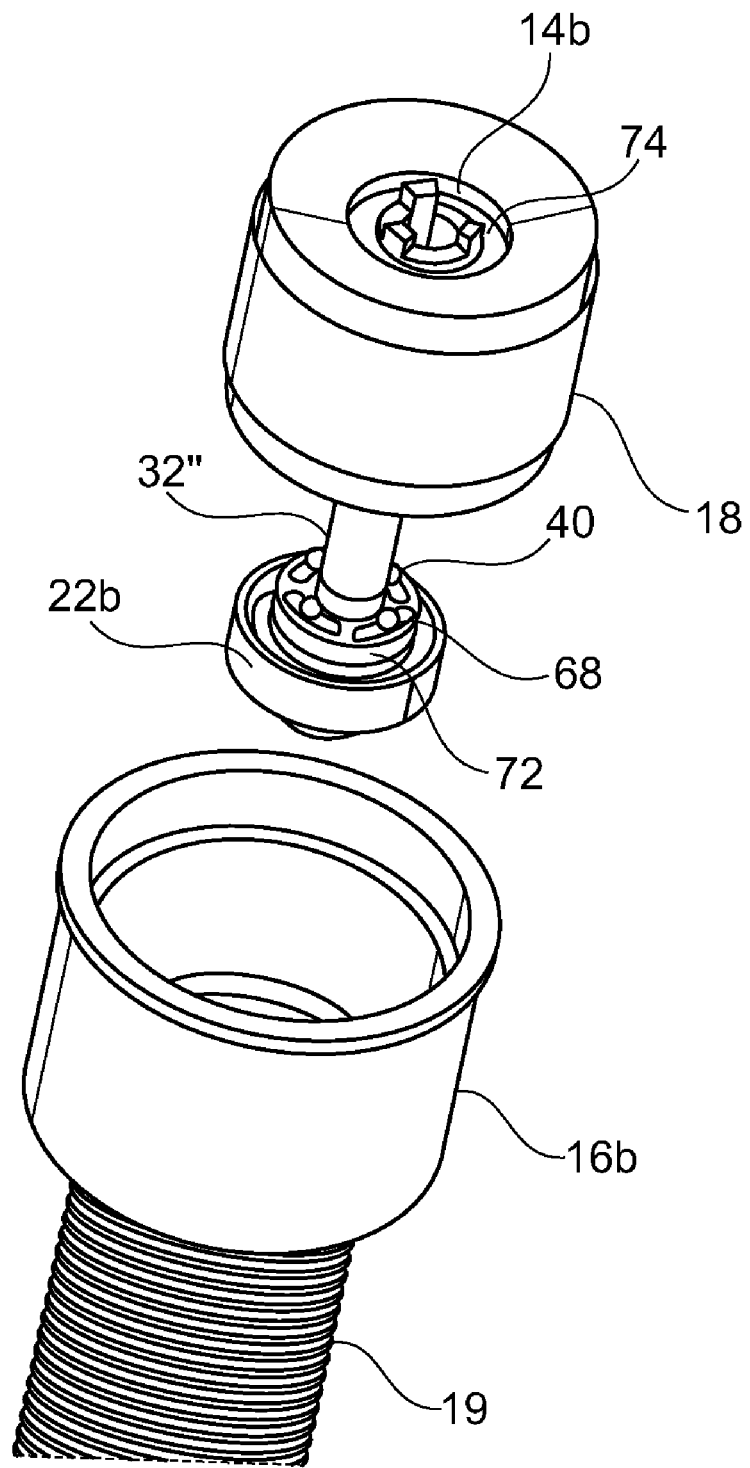
FIG. 12 shows an exploded representation of part of the illustrative embodiment of FIG. 11.

FIG. 12 shows an exploded view of significant components of actuator 10e. On the side of the stator sleeve 14b which faces the stationary part 12, it is possible to see the stop sections 74, which interact with complementary stops on the stationary part 12 in order to limit the rotary motion of the stator sleeve 14b to a degree which is sufficient to decouple the rotor 16b from the stationary part 12. The lower part of the stator sleeve 14b is not shown so as to allow a view of the coupling device 36c with the lifting sleeve 72 and the balls 40 guided in the grooves 68 provided thereon. Attached to the lifting sleeve 72 is the bearing 22b, which ensures turnability/support between the rotor 16b and the lifting sleeve 72. The lifting sleeve 72 is secured in a rotationally fixed and axially displaceable manner on the supporting tube 32". In FIG. 12, the vehicle-facing end of the supporting tube 32", which extends through the stator sleeve 14b, is not shown for reasons of clarity.

Figure 13:
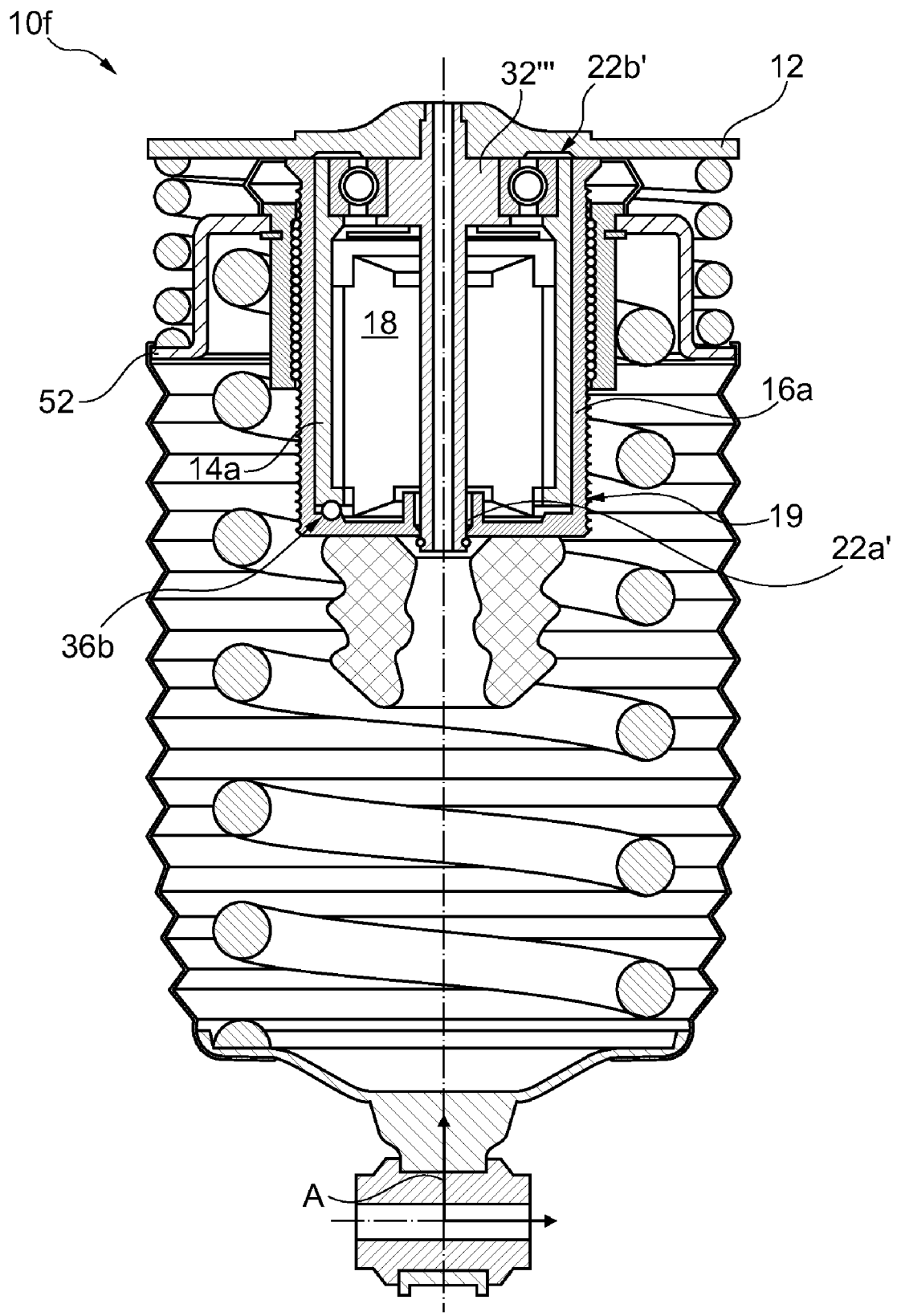
FIG. 13 shows a seventh illustrative embodiment of the actuator according to the invention.

FIG. 13 shows an embodiment 10f of the actuator which is of particularly compact construction in the axial direction. The principle of operation is based fundamentally on the principle of operation of the actuator 10d with the coupling device 36b. In the case of actuator 10f, the spindle 19 is arranged in the region of the electric motor, on the radial outside of the secondary rotor 16a. The primary rotor 14a is furthermore supported radially with the aid of a bearing 22b' against a supporting tube 32''' which—in contrast with the solid supporting tube 32' of actuator 10d—is hollow. Radial support for the secondary rotor 16a is provided solely by a bearing 22a', which is provided between the supporting tube 32''' and the rotor 16a. Moreover, the rotor 14a is not supported axially against the supporting tube 32''' but directly against a stationary part 12 in the rest position.

The embodiments described above make clear that the concept according to the invention can be implemented in a large number of actuator versions—especially as regards the mounting of the individual components, the relative arrangement of the rotors and the type of coupling device employed. This means that individual aspects can be combined as desired without departing from the two-phase actuating concept according to the invention involving two rotatable rotors.

The invention claimed is:

1. Actuator, which is actuated along a longitudinal axis (A), in particular for a spring carrier (50), comprising:
   a stationary part (12, 32, 32'),
   a first rotor (14, 14a, 14b), which can be driven so as to perform a rotary motion,
   a rotatable second rotor (16, 16a, 16b), which is supported against the stationary part (12, 32, 32') in the axial direction in an axial rest position,
   a coupling device (36, 36a, 36b, 36c), by means of which the second rotor (16, 16a, 16b) is coupled to the first rotor (14, 14a, 14b), and
   an output element (52), which is connected to the second rotor (16, 16a, 16b) and is moved axially by means of a rotary motion of the second rotor (16, 16a, 16b),
   the coupling device (36) interacting with the first rotor (14, 14a, 14b) and the second rotor (16, 16a, 16b) in such a way
   that, starting from the rest position, an axial movement of the second rotor (16, 16a, 16b) is produced by means of a first rotary motion of the first rotor (14, 14a, 14b) in order to release the said second rotor from the stationary part (12, 32, 32') and thereby bring it into a working position, and
   that, in the working position of the second rotor (16, 16a, 16b), the second rotor (16, 16a, 16b) is driven, by means of a second rotary motion of the first rotor (14, 14a) or by driving the second rotor (16, 16a, 16b) relative to the first rotor (14b), so as to perform a rotary motion in order to move the output element (52) axially while the second rotor (16, 16a, 16b) is substantially stationary in the axial direction.

2. Actuator according to claim 1, wherein the actuator has a friction device (30), by means of which the second rotor (16, 16a, 16b) is brought into frictional engagement with the stationary part (12, 32, 32') in the rest position in order to fix the second rotor (16, 16a, 16b) firmly against rotation.

3. Actuator according to claim 2, wherein the second rotor (16, 16a, 16b) is released from the friction device (30) in the working position, or in that the second rotor (16, 16a, 16b) together with the friction device (30) is released from the stationary part (12, 32, 32') in the working position.

4. Actuator according to claim 1, wherein the first and the second rotor (14, 14*a*, 14*b* and 16, 16*a*, 16*b*, respectively) are arranged coaxially.

5. Actuator according to claim 4, wherein the second rotor (16, 16*a*, 16*b*) is arranged on the inside or on the outside of the first rotor (14, 14*a*, 14*b*) in the radial direction.

6. Actuator according to claim 1, wherein the second rotor (16, 16*a*, 16*b*) is supported towards the inside in the radial direction.

7. Actuator according to claim 1, wherein the second rotor (16, 16*a*, 16*b*) comprises a threaded spindle (19), the output element (52) containing a threaded nut (55) which interacts with the threaded spindle (19).

8. Actuator according to claim 1, wherein the coupling device (36, 36*a*, 36*b*, 36*c*) permits a limited rotary motion of the first rotor (14, 14*a*, 14*b*) relative to the second rotor (16, 16*a*, 16*b*), thereby bringing about an axial relative motion of the first rotor (14, 14*a*, 14*b*) and of the second rotor (16, 16*a*, 16*b*).

9. Actuator according to at claim 1, wherein the coupling device (36, 36*b*, 36*c*) comprises at least one ramp (38, 38'), which slopes relative to a plane normal to the longitudinal axis (A) of the actuator.

10. Actuator according to claim 9, wherein the ramp (38, 38') interacts with an associated counter surface (42, 70*a*, 68) or counter ramp via a rolling contact element (40).

11. Actuator according claim 10, wherein the ramp (38, 38') is of V-shaped or curved design, a non-sloping section (38*b*) preferably being provided between the legs (38*a*) of the V or between curved ramp sections.

12. Actuator according to claim 1, wherein the coupling device (36*a*) has at least one first groove (64*a*) associated with the first rotor (14*a*) and one second groove (64*b*) associated with the second rotor (16*b*), a rolling contact element (40) arranged in the grooves (64*a*, 64*b*), which couples the first rotor (14*a*) and the second rotor (16*b*) to one another, being provided between the first rotor (14*a*) and the second rotor (16*b*).

13. Actuator according to claim 12, wherein at least one of the grooves (64*b*) slopes and/or is curved at least in a certain section or sections relative to a plane normal to the longitudinal axis (A) of the actuator.

14. Actuator according to claim 1, wherein the coupling device (36, 36*a*, 36*b*) has a stop which limits a rotary motion of the first rotor (14, 14*a*) relative to the second rotor (16, 16*a*).

15. Actuator according to claim 1, wherein the coupling device (36, 36*a*, 36*b*) has a stop (26', 26", 32*a*, 32*b*, 32*c*, 76) which limits an axial motion of the second rotor (16, 16*a*) relative to the first rotor (14, 14*a*).

16. Actuator according to claim 1, wherein one of the rotors (14, 16) has a shoulder (26"), which can be brought into contact with a flange-type projection (26') on the other rotor (16) by means of the second rotary motion in order to bring about rotationally rigid coupling of the rotors (14, 16).

17. Actuator according to claim 1, wherein the first rotor (14) is moved in the axial direction.

18. Actuator according to claim 1, wherein the first rotor (14, 14*a*, 14*b*) is rotatably mounted on the stationary part (12) or on a component (20, 32''') securely connected to the stationary part (12).

19. Actuator according to claim 18, wherein the first rotor (14*b*) is mounted in a manner which allows limited turning, and in particular in that the first rotor (14*b*) has a stop device (74) which interacts with a stop associated with the stationary part (12) in order to limit turning of the first rotor (14*b*).

20. Actuator according to claim 19, wherein the coupling device (36*c*) comprises a constructional element (72) which is connected in a rotationally fixed and axially displaceable manner to the stationary part (12) or to a component (32''') securely connected to the stationary part (12) and which is coupled to the first rotor (14*b*) in such a way that a relative rotation between the first rotor (14*b*) and the constructional element (72) brings about an axial displacement between the first rotor (14*b*) and the constructional element (72).

21. Actuator according to claim 20, wherein the second rotor (16*b*) is mounted on the constructional element (72) in such a way as to be effective for axial driving but rotatable.

22. Actuator according to claim 1, wherein a rolling contact bearing (22, 22*a* and 22*b*' respectively) is arranged between the first rotor (14, 14*a*) and the stationary part (12) or a component (32") securely connected to the stationary part (12).

23. Actuator according to claim 22, wherein an elastic element, in particular a corrugated spring, is arranged between the first rotor (14) and the rolling contact bearing (22).

24. Actuator according to claim 1, wherein together with a stator (18), which is associated with the stationary part (12, 32, 32', 32'''), the first rotor (14, 14*a*) forms an electric motor.

25. Actuator according to claim 1, wherein at least one functional element (18) associated with the first rotor (14*b*) forms an electric motor together with at least one functional element (34) associated with the second rotor (16*b*).

26. Spring carrier for a spring or spring/damper device of a vehicle, comprising a spring (54), which is arranged between two spring plates and the preload of which can be set by means of an axial displacement of one of the spring plates (52), the spring carrier having an actuator in accordance with claim 1, by means of which the axial displacement can be produced.

27. Method for the axial movement of an output element, comprising the steps of:
starting from a rest position, an axial movement of a second rotor (16, 16*a*, 16*b*), which is supported against the stationary part (12, 32, 32') in the rest position, is produced by means of a first rotary motion of a first rotor (14, 14*a*, 14*b*) in order to release the second rotor (16, 16*a*, 16*b*) from the stationary part (12, 32, 32') and thereby bring it into a working position, and
when in the working position of the second rotor (16, 16*a*, 16*b*), the second rotor (16, 16*a*, 16*b*) is driven, by means of a second rotary motion of the first rotor (14, 14*a*, 14*b*) or by driving the second rotor (16, 16*a*, 16*b*) relative to the first rotor (14, 14*a*, 14*b*), so as to perform a rotary motion in order to move the output element (52) axially while the second rotor (16, 16*a*, 16*b*) is substantially stationary in the axial direction.

28. Method according to claim 27, wherein during the first rotary motion a limited rotary motion of the first rotor (14, 14*a*, 14*b*) takes place relative to the second rotor (16, 16*a*, 16*b*), by means of which an axial relative motion between the first and the second rotor (14, 14*a*, 14*b* and 16, 16*a*, 16*b* respectively) is produced.

29. Method according to claim 28, wherein during the first rotary motion, the second rotor (16, 16*a*) is moved axially until a rotationally rigid coupling has been established between the first and the second rotor (14, 16*a* and 16, 16*a* respectively).

30. Method according to claim 29, wherein during the first rotary motion, the first rotor (14) is moved axially until the first rotor (14) strikes against the stationary part (12).

31. Method according to claim 30, wherein the first rotor (14) and the second rotor (16) are moved axially in opposite directions during the first rotary motion.

32. Method according to claim 28, wherein during the first rotary motion, the second rotor (16*b*) is moved axially until a rotationally rigid coupling has been established between the first rotor (14*b*) and the stationary part (12) or a component (32") securely connected to the stationary part (12).

33. Method according to claim 32, wherein once the working position has been reached, the second rotor (16*b*) is driven so as to perform a rotary motion and the first rotor (14*b*) is held firmly against rotation.

* * * * *